Sept. 25, 1962 L. W. HARDMAN 3,055,520
TRACTORS OR LIKE VEHICLES
Filed Dec. 23, 1959 4 Sheets-Sheet 3

Sept. 25, 1962 L. W. HARDMAN 3,055,520
TRACTORS OR LIKE VEHICLES
Filed Dec. 23, 1959 4 Sheets-Sheet 4
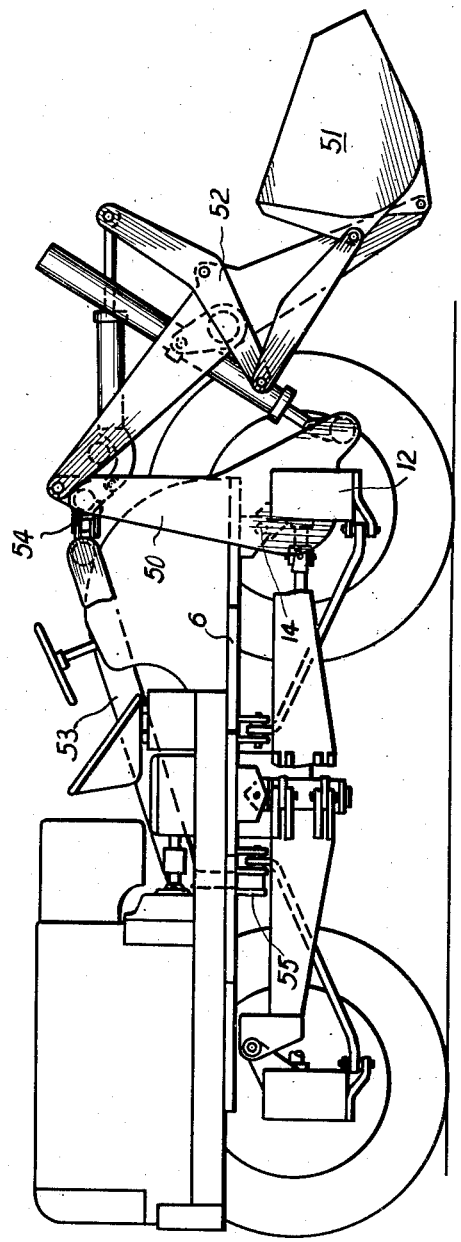

United States Patent Office 3,055,520
Patented Sept. 25, 1962

3,055,520
TRACTORS OR LIKE VEHICLES
Laurie William Hardman, Sarsfield, Victoria, Australia, assignor of one-half to Cranes & Shovels Proprietary Limited, Moorabbin, Victoria, Australia, a company of Australia
Filed Dec. 23, 1959, Ser. No. 861,572
15 Claims. (Cl. 214—140)

This invention relates to tractors and like vehicles and more particularly to four wheel drive heavy duty earth moving vehicles.

Vehicles of this type at present in use are constructed so that at least the axle upon which the driving wheels are supported is rigidly connected to the vehicle frame. Whilst this construction is essential in order to ensure the vehicle is reasonably stable under all working conditions, it severely reduces the traction between the driving wheels and the ground when operating on rough or uneven ground.

In another known construction both axles are pivotally connected to the chassis so as to permit transverse oscillation of the axles when traversing uneven ground. With both axles so pivoted to the chassis it is necessary to provide rigid stabilizer beams interconnecting both axles to the chassis in order to stabilize the chassis. A vehicle such as this is disclosed in U.S.A. Patent 2,343,800 by Rauch. The use of these rigid stabilizer beams prevents the pivotal movement of the axles relative to the chassis in a horizontal plane, to effect steering of the vehicle.

Accordingly, in these vehicles it is necessary to use a steering mechanism of the Ackerman type having the wheels mounted on separate stub axles connected to the main axle beams by king pins. In heavy vehicles such as tractors and earth moving equipment the use of this type of steering mechanism reduces the reliability of the vehicle because of the inherent weakness in the king pin connections, and the auxiliary linkage, particularly when the wheels on both axles are to be steerable. Furthermore due to the large number of parts and the precision machining required, this steering arrangement is comparatively expensive.

It is therefore the principal object of the present invention to provide a tractor or like vehicle having maximum stability and traction under all working conditions and which is economic to manufacture and efficient and reliable in operation.

It is a further object of the invention to provide such a tractor or like vehicle which has all four wheels driven by the one power unit.

With the above stated principal object in view there is provided according to the present invention, a tractor or like power driven vehicle comprising a rigid chassis, a front and rear axle each carrying a pair of transport wheels and pivotally connected to said chassis for angular movement relative thereto about respective vertical and longitudinal horizontal axes, means for transmitting power to at least one of said axles, means for angularly moving both said axles in unison about their respective vertical axes relative to the chassis to effect the steering of the tractor and weight transfer means interconnecting both of said axles with two transversely spaced points on the chassis, said weight transfer means being so arranged to maintain the chassis substantially stable and permit oscillation of the axles relative to the chassis about the respective vertical and horizontal axes.

With this construction the chassis is supported at four points through which the weight of the chassis and components is transferred to the axle, namely the direct pivotal connections between the two axles and the chassis, and the two spaced points on the chassis connected to the axles by the weight transfer means, and yet the two axles are free to oscillate in a vertical plane when traversing uneven ground, and in a horizontal plane to effect steering of the vehicle.

Thus, the tractor can operate in extremely rough terrain and will remain substantially stable with all four wheels in firm contact with the ground.

Conveniently, each axle and each spaced point on the chassis are connected, through ball type joints, by means of rigid weight transfer arms.

The invention will be more readily understood from the following description of one practical arrangement of the tractor as illustrated in the accompanying drawings.

In the drawings:

FIGURE 5 is a side view illustrating the attachment of earth moving equipment to the tractor.

Figure 1:
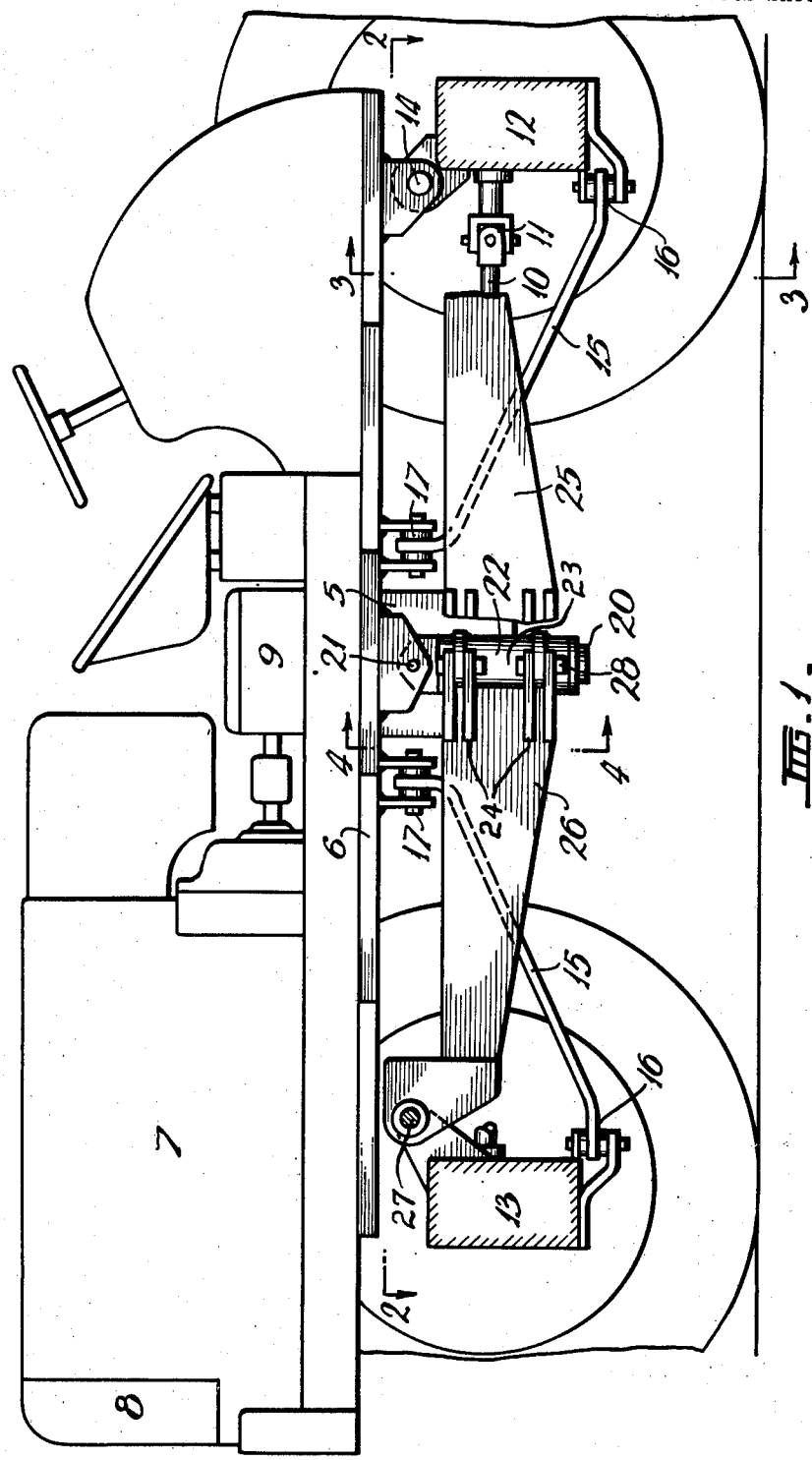
FIGURE 1 is an elevation of the tractor with portion of one weight transfer arm broken away to show the pivot connection of the axle to the chassis.

In the following description when reference is made to a horizontal and vertical disposition, it is assumed that the tractor is travelling in a straight line on flat ground, and it is to be understood that the disposition will vary as the tractor turns and/or traverses uneven ground.

The chassis 6 consists of a rigid steel plate of sufficient thickness to resist twisting and distortion under all normal working conditions.

Mounted upon the chassis 6 is the engine 7, radiator 8, gear box 9, and all associated auxiliary equipment. The gear box 9 is drive coupled to the transfer box 5, mounted below the chassis, from which the power is transmitted to the front and rear axles through respective conventional tailshafts 10 and universal joints 11.

Figure 2:
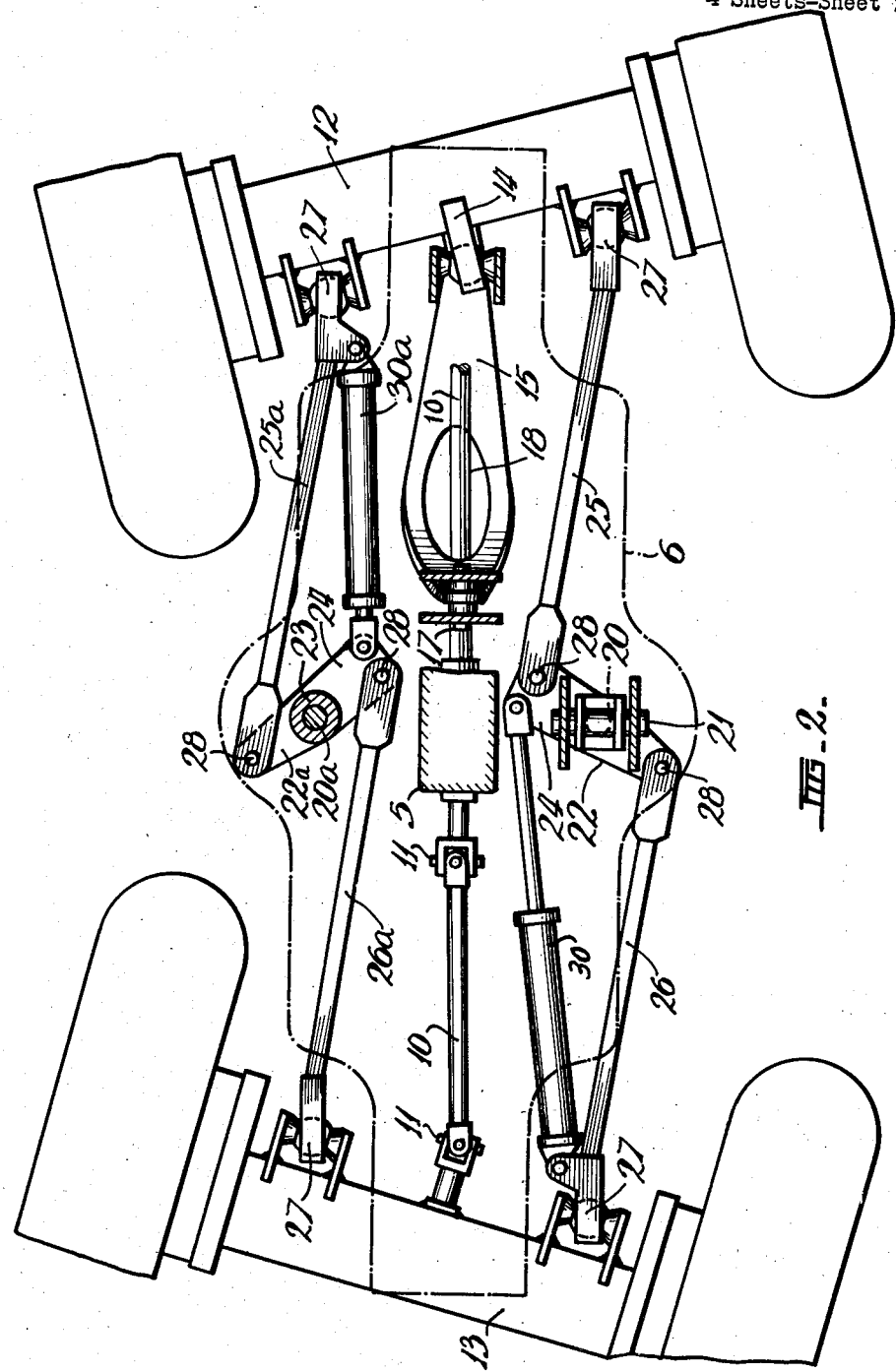
FIGURE 2 is a plan view along line 2—2 in FIGURE 1 with the axles in the position for minimum turning circle.
Figure 3:
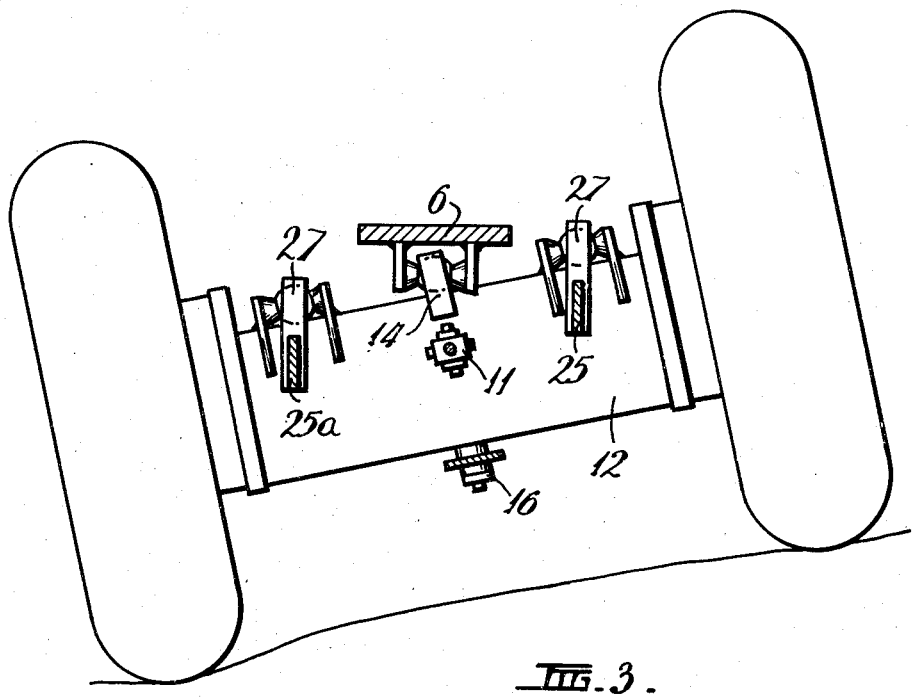
FIGURE 3 is a view along line 3—3 in FIGURE 1 showing the relative positions of the axle and chassis when travelling on sloping terrain.
Figure 4:
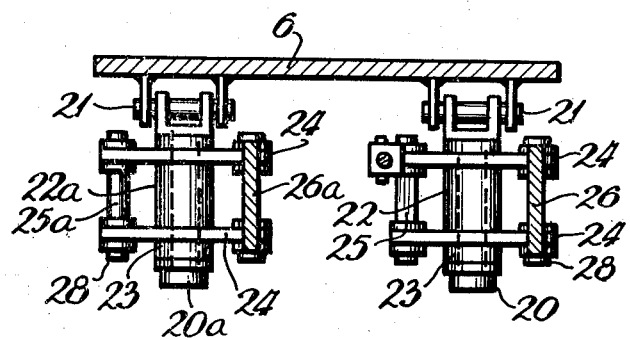
FIGURE 4 is a view along line 4—4 in FIGURE 1.

The front axle 12 and rear axle 13 are each fitted with a pair of large diameter wheels and pneumatic tyres and are each connected through respective ball joints 14 to the chassis 6. For the sake of clarity the ball joint 14 between the front axle and the chassis only is shown in FIGURE 1, and similarly in FIGURE 2 only the ball joint between the front axle and the chassis is shown. The ball joints 14 are constructed to allow sufficient angular movement between the axles and the chassis, in the horizontal plane for effective steering of the tractor, and in the vertical plane to allow for the transverse oscillation of the axles when traversing uneven ground.

A torque member 15 is connected between each axle and the chassis to transmit the reaction of the driving torque from the axles to the chassis.

Each torque member is pivotally connected to the respective axle by a vertical pin joint 16 coaxial with the vertical axis of the ball joint 14, and to the frame by a horizontal pin joint 17 coaxial with the longitudinal horizontal axis of the ball joint. By arranging the torque member connections in this manner the steering and transverse oscillating movement of the axle is not restricted in any way by the torque members 15.

Each torque member has an aperture 18 through which the respective tail shaft 10 passes.

Suspended from the underside of the chassis between the front and rear axle are two spaced transversely aligning vertical weight transfer pins 20 and 20a. The weight transfer pins are positioned symmetrically with respect to the longitudinal axes of the chassis and are pivotally connected to the chassis by pins 21 for movement about a horizontal transverse axis. Each weight transfer pin has a rocker, 22 and 22a respectively, rotatably mounted thereon.

Each rocker comprises a sleeve 23 and a pair of arms 24 welded to the sleeve in vertical alignment.

A pair of weight transfer arms 25 and 25a connect the front axle to one end of the respective rockers 22 and 22a, and a similar pair of weight transfer arms 26 and 26a connect the rear axle to the other end of each rocker. The weight transfer arms are pivotally connected to the cooperating rockers for angular movement about respective vertical axes by pins 28, and to the respective axles by ball joints 27. The weight which is transferred by the arm to the axle is the combined weight of the chassis, engine, gear box and all components supported by the chassis.

The horizontal axis of the ball joints 27, the pins 21, and the ball joint 14 are all disposed in a common horizontal plane.

The steering cylinder 30 is connected at one end to the weight transfer arm 26 adjacent to the rear axle, and at the other end to the rocker 22 at the end thereof opposite to which the weight transfer arm 26 is connected. A complementary steering cylinder 30a is similarly connected between rocker 22a and weight transfer arm 25a.

Both steering cylinders 30 and 30a are double acting and are controlled by a steering valve so that one extends as the other contracts to effect steering of the tractor.

With the axles and chassis interconnected in this manner, the chassis is supported at four symmetrically positioned points to achieve complete stability, and the two axles are free to oscillate vertically when traversing uneven ground and to only transfer a portion of this movement to the tractor frame. This freedom of axle movement enables the tractor to be used in extremely rough terrain without loss of traction between the wheels and the ground and the improved stability gives greater safety to the operator under such conditions.

The tractor is particularly suitable for the attachment of earth moving equipment such as shovels, bulldozer blades and the like. In order to increase the maneuverability of this equipment it is attached to one of the axles, preferably the front axle.

For this purpose an upwardly projecting frame 50 is rigidly attached to the front axle 12 and the shovel 51 is attached thereto by a known linkage 52. A load transfer member 53 is pivotally connected at 54 to the upper end of the frame 50 for relatively angular movement about an axis coaxial with the vertical axis of the ball joint 14 connecting the front axle 12 to the chassis 6. The other end of the load transfer member 53 is connected at 55 to the chassis 6, for angular movement about an axis coaxial with the longitudinal axis of the ball joint 14 between the front axle 12 and the chassis 6.

With the load transfer member 53 connected in this manner the thrust developed by the operation of the shovel is transferred to the chassis without restricting relative movement between the axle and the chassis.

I claim:

1. A tractor comprising a rigid chassis having longitudinal and transverse axes, a front and rear axle, a pair of transport wheels on each said axle, each of said axles being pivotally connected to said chassis for angular movement relative thereto about respective vertical and longitudinal horizontal axes, means for transmitting power to at least one of said axles, means for angularly moving both said axles in unison relative to said chassis about respective vertical axes to effect steering of the tractor, means pivotably connected to said chassis at spaced transverse locations thereon for movement about a horizontal transverse axis, and weight transfer means connecting each of said axles to a respective one of said spaced transverse means at said locations to provide support for said chassis by said axles to maintain the chassis stable while permitting pivotal movement of said axles relative to the chassis about the respective vertical and horizontal axes.

2. A tractor or like vehicle as claimed in claim 1 wherein the weight transfer means comprise two pair of rigid weight transfers members, one pair operatively connecting the respective axles to the means pivotably connected to the chassis.

3. A tractor or like vehicle as claimed in claim 2 wherein said means pivotably connected to the chassis includes a rocker member, angularly movable about a vertical axis, pivotally suspended from each spaced point on the chassis for angular movement about a transverse horizontal axis, the respective ends of each rocker member being connected to the respective axles by the weight transfer members.

4. A tractor or like vehicle as claimed in claim 3 wherein the respective weight transfer members of each pair are connected to the axle through ball type joints disposed symmetrically on either side of the pivot connection between the axle and the chassis.

5. A tractor as claimed in claim 4 wherein the horizontal axes of the pivotal connections between the axles and the chassis, between the rockers and the chassis, and between the weight transfer members and the axles are all disposed in the one plane.

6. A tractor or like vehicle as claimed in claim 4 wherein the axles are connected to the chassis by respective centrally disposed ball type joints and a torque reaction member is connected between each axle and the chassis.

7. A tractor or like vehicle as claimed in claim 6 wherein each torque reaction member is connected to its respective axle for angular movement about the vertical axis to the ball type joint and to the chassis for angular movement about the longitudinal horizontal axis of said ball type joint.

8. A tractor or like vehicle as claimed in claim 4 wherein there is connected between at least one rocker member and an associated weight transfer member a double-acting power cylinder to effect relative angular movement therebetween and a corresponding angular movement between the axles and the chassis to effect steering of the tractor.

9. A tractor or like vehicle as claimed in claim 7 wherein there is provided two double acting power cylinders one connected between each rocker arm and an associated weight transfer member respectively, said cylinders being arranged for contra-operation to effect steering of the tractor.

10. A tractor or like vehicle as claimed in claim 3 wherein there is connected between at least one weight transfer member and the chassis a double acting power cylinder to effect relative angular movement between the axles and the chassis for the steering of the tractor.

11. A tractor or like power vehicle comprising a rigid chassis, an engine mounted upon said chassis, a front and rear axle each carrying a pair of transport wheels and connected to said chassis for relative angular movement about respective vertical and longitudinal horizontal axes, means for transmitting power from said engine to at least one of said axles, means for angularly moving at least one of said axles relative to the chassis about its vertical axis to effect steering of the vehicle, a pair of pivot pins one suspended from each of two transversely spaced points on the chassis for angular movement about a common horizontal transverse axis, a rocker member supported by each pivot pin for angular movement about a vertical axis, two pair of rigid weight transfer members one pair connecting the front axle to one end of the respective rocker members and the other pair connecting the rear axle to the other end of the respective rocker members so that the chassis will remain substantially stable and the axles are permitted to oscillate relative to the chassis about their respective vertical and horizontal axes.

12. A tractor or like vehicle as claimed in claim 11 wherein the respective weight transfer members of each pair are connected to the axle through ball type joints disposed symmetrically on either side of the pivot connection between the axle and the chassis.

13. A tractor or like vehicle as claimed in claim 12 wherein the axles are connected to the chassis by respective centrally disposed ball type joints and a torque reaction member is connected between each axle and the chassis.

14. A tractor or like vehicle as claimed in claim 13 wherein the horizontal axes of the pivot connections between the axles and the chassis, between the pivot pins and the chassis, and between the weight transfer members and the axles are all disposed in the one plane.

15. A tractor as claimed in claim 11 wherein an earth-working or like implement is supported by a frame rigidly attached to the front axle and wherein a load transfer member is connected to the upper end of the frame for angular movement about the vertical axis of the pivot connection between the front axle and the chassis, and to the chassis for angular movement about the longitudinal axis of the pivot connection between the front axle and the chassis, so that the thrust load resulting from the operating of the equipment is transferred to the chassis without restricting the relative movement between the front axle and the chassis.

References Cited in the file of this patent

UNITED STATES PATENTS

| | | |
|---|---|---|
| 1,457,692 | Carter | June 5, 1923 |
| 2,343,800 | Rauch | Mar. 7, 1944 |
| 2,415,744 | Josephson | Feb. 11, 1947 |
| 2,598,863 | Tucker | June 3, 1952 |
| 2,742,720 | Parker et al. | Apr. 24, 1956 |